May 3, 1932. D. M. SOLENBERGER 1,856,271
PISTON RING
Filed Oct. 31, 1930

Inventor:
Dean M. Solenberger,
By Whittemore Hulbert Whittemore & Belknap
Attys.

Patented May 3, 1932

1,856,271

UNITED STATES PATENT OFFICE

DEAN M. SOLENBERGER, OF CLEVELAND, OHIO, ASSIGNOR TO THE SIMPLEX PISTON RING COMPANY OF AMERICA, INC., A CORPORATION OF OHIO

PISTON RING

Application filed October 31, 1930. Serial No. 492,550.

The invention relates to piston rings of the type known as oil rings and which are designed to limit the oil consumption in the operation of the engine. Such rings are located as the lowermost of a series engaging the piston or rings furthest removed from the combustion chamber. The oil is usually removed by passing it radially inward into a drained ring groove, either through apertures formed centrally through the body of the ring or through channels connecting with the lower face thereof. Such rings are not relied upon to hold gas compression but function primarily to remove oil from the cylinder wall save the thin film required for lubrication. Nevertheless, a certain amount of gas compression is held by such oil rings and even with the most perfect construction, some oil, more than that required for the lubricating film, will find its way past the periphery of the ring and accumulate between the same and the ring next higher in the series.

It is the object of the present invention to prevent the accumulation of oil between the rings thereby avoiding final passage of the same into the combustion chamber. This I have accomplished by providing a vent from the space above the oil ring, permitting the slight leakage of gas compression passing the ring higher up to blow out the oil. It is, however, desirable to make the oil ring as effective as possible in preventing surplus oil from passing its periphery and this is difficult for a number of reasons. If, as frequently happens in commercial manufacture, the ring is warped or twisted even to a very slight extent, this will hold certain portions of the periphery spaced by a greater distance from the cylinder wall which will permit a thicker film of oil passing therebetween. Again, as is also a frequent occurrence, if the cylinder is warped or non-circular, portions of the ring will not accurately conform thereto. This may be partially corrected by the use of an expander having distributed points of bearing on the ring and by making the ring sufficiently flexible to be conformed to a greater or less extent to the cylinder, but there is still a lack of exact conformity or exact parallelism between the ring periphery and the cylinder wall particularly after first installation. To overcome this difficulty, I have devised a construction which when first installed will be efficient in holding back the oil and one which also cooperates in the venting of the space between the oil rings for the removal of any oil accumulating therein. With these objects in view, the invention consists in the construction as hereinafter set forth.

Figure 1:
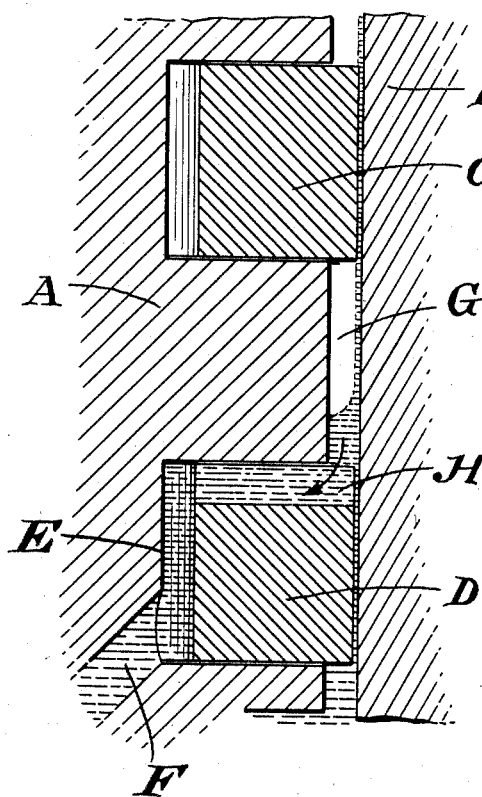
Figure 1 is a section through a portion of a piston in a cylinder showing one embodiment of my invention.

As shown in Figure 1, A is the piston; B the cylinder wall; C one of the upper rings of a series or a compression holding ring; and D is one construction of my improved oil ring. The ring D occupies a ring groove E which is provided with a drain passage F through which any oil accumulating in the groove is discharged back into the crank case. As has been stated, it is the primary object of my invention to vent or drain the space between rings such as the space G between the rings C and D. This in Figure 1 is effected by forming in the ring D channels H in its upper face which establish communication between the space G and the groove E on the inner side of the ring. Thus, if any oil other than the lubricating film forces its way past the ring D into the space G, an escape is provided through the channel H, ring groove E, and drain passage F. Furthermore, the leakage of gas past the ring C which is unavoidable even with the most perfect rings will blow any accumulated oil in the passage G out through the vent passages just described.

Figure 2:
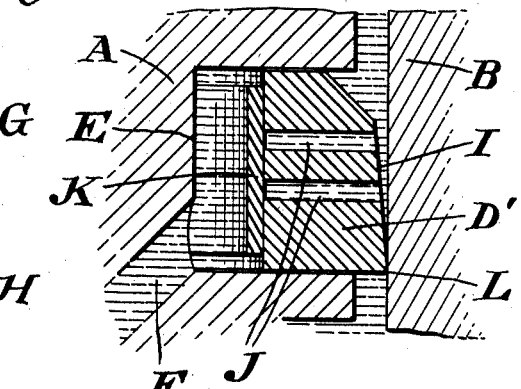
Figures 2, 3 and 4 are similar views showing modified constructions.

A second feature of my invention is the means employed for quickly establishing an effective oil seal between the oil ring and the cylinder wall. This, as shown in Figure 2, consists in a ring D' having its peripheral face I nonparallel to the cylinder wall in the direction of the axis of said cylinder. This peripheral face is tapered from the lower edge of the ring upward at a predetermined angle to the cylinder wall which may be varied to suit conditions, such as different materials and different degrees of accuracy in the manufacture of the ring. However, I have found that a taper of from two and one-half to three degrees is a satisfactory maximum limit of angularity. By reason of this taper, the upper portion of the peripheral face of the ring is spaced from the cylinder wall so as to be in communication with passages J extending through the ring and forming a communication with the ring groove E. An expander K preferably of the corrugated ribbon form is arranged in the ring groove between the initial wall thereof and the ring and by this distributed contact forces all portions of the ring with substantially equal pressure in a radially outward direction.

With the construction just described, when the ring is first installed, its lower edge L is first pressed into contact with the cylinder wall and if there are any high spots in the circumference, these will be quickly worn down so as to form a line completely around the ring which is parallel to the cylinder wall. Further wear of the ring will widen this line of contact until the resistance of the oil film will prevent further wear. Thus, from the very start of the operation of the engine, the ring D' will be effective in scraping off the surplus oil from the cylinder wall leaving only a thin film thereon for lubrication. However, as has been previously stated, under certain conditions and particularly under high speed operation, more oil than necessary will pass the periphery of the ring so that with an ordinary construction it would accumulate in the space G between the rings. This result is prevented by the clearance space between the upper portion of the ring and the cylinder wall formed by the taper, which space is in communication with the channels J and through the latter with the ring groove E and drain passage F. Therefore, the tapered periphery of the ring performs a double function. First, it quickly provides an effective oil seal, and second, it establishes a drain connection between the space above the ring and the ring groove.

Figure 3:
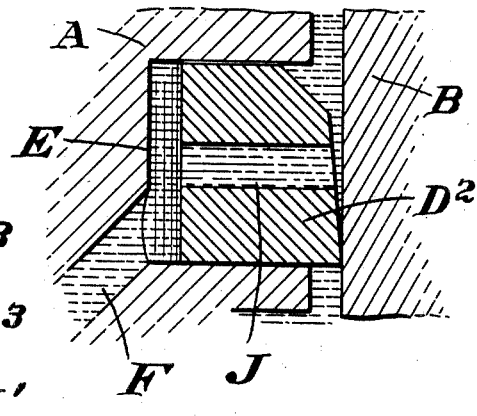

Figure 3 shows a construction of ring $D^2$ which is similar to the ring D' but without the expander and with only a single slot or channel J therein instead of the two channels shown in Figure 2.

Figure 4:
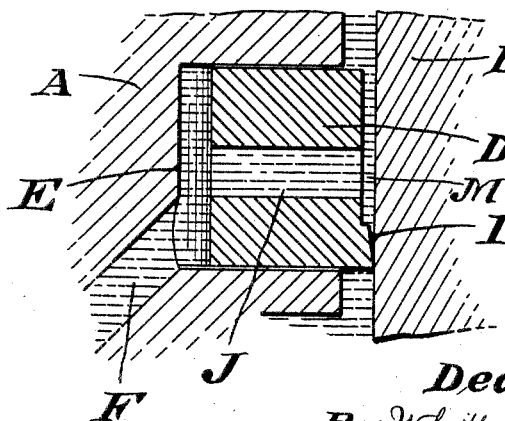

Figure 4 shows another modification in which the tapered portion I' of the periphery of the ring is at the lower end thereof only, while above this portion, the peripheral face is cut away to form a clearance space M which is in communication with the channel J. Both of these modifications will function in the same way as that shown in Figure 2 to effect first an oil seal and second, to provide a drain passage.

What I claim as my invention is:

1. A piston ring having its peripheral face initially transversely tapered at an angle to the axis of the cylinder of not over 3°, and an aperture through the ring between the upper and lower edges thereof whereby said tapered face will eventually wear into parallelism with the cylinder wall, thereby sealing said aperture.

2. The combination of a relatively thin piston ring and a corrugated ribbon expander, said piston ring having apertures therethrough and a peripheral face non-parallel to the cylinder wall to form an initial contact of restricted area and high unit pressure, the difference in angle between said peripheral face and cylinder wall being restricted to permit of eventually wearing into parallelism and sealing said apertures, and a cut-away portion of greater angularity to limit the contacting area and unit pressure under working conditions.

3. In combination with a cylinder and a grooved piston therein, of a relatively thin ring in said groove and a corrugated ribbon expander, said ring having apertures therethrough and a peripheral face non-parallel to the cylinder wall to form an initial contact of restricted area and high unit pressure, the difference in angle between said peripheral face and cylinder wall being restricted to permit of eventually wearing into parallelism, a cut-away portion of greater angularity to limit the contacting area and unit pressure under working conditions and to provide a space for receiving lubricant, and vent means initially communicating with said space.

4. The combination with a cylinder and a grooved piston therein, of a ring in said groove having apertures therethrough and a peripheral face non-parallel to the cylinder wall to form an initial contact of restricted area and high unit pressure, the difference in angle between said peripheral face and cylinder wall being restricted to permit of eventually wearing into parallelism and sealing said apertures, a cut-away portion of greater angularity to limit the contacting area and unit pressure under working conditions, and a corrugated ribbon expander in said groove for circumferentially distributing the pressure on said ring and expediting the wearing in.

In testimony whereof I affix my signature.

DEAN M. SOLENBERGER.